DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED MAY 6, 1975

934 OG 7

T934,003

PROCESS FOR PREPARING POWDERS

Harris N. Stephens, Jr., 921 Glade Mill Drive, Kingsport, Tenn. 37663, and Melvin D. Fink, 2309 Lakespur Drive, Johnson City, Tenn. 37601

Filed Feb. 22, 1974, Ser. No. 444,939

Int. Cl. B22d *23/08*

U.S. Cl. 264—9

No Drawing. 8 Pages Specification

A process is disclosed for dyeing a bundle of dry-spun acrylonitrile polymer filaments after the filaments have been extruded through a spinneret from a solution of the polymer in a solvent therefor, and before the solvent remaining after the spinning step has been extracted. The extruded but unextracted filaments are passed over a rotating roll wetted with dye solution, preferably after moistening them by passing them over a rotating roll wetted with water, and are then drawn in air about 1.5× to 2.0×. Preferably, the extrusion, dyeing, and drawing steps are carried out continuously. Temperature conditions are not critical. After the filaments are dyed and drawn, they can be washed to remove spinning solvent and can be drawn further during the wash step.